United States Patent
Hameleers et al.

(10) Patent No.: US 7,330,906 B2
(45) Date of Patent: *Feb. 12, 2008

(54) METHOD AND SYSTEM FOR MULTIPLE HOSTS ANYCAST ROUTING

(75) Inventors: Heino Hameleers, Kerkrade (NL); Frank Hundscheidt, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 773 days.

This patent is subject to a terminal disclaimer.

(21) Appl. No.: 10/467,910

(22) PCT Filed: Feb. 18, 2002

(86) PCT No.: PCT/EP02/01706

§ 371 (c)(1),
(2), (4) Date: Feb. 3, 2004

(87) PCT Pub. No.: WO02/076019

PCT Pub. Date: Sep. 26, 2002

(65) Prior Publication Data

US 2005/0044141 A1    Feb. 24, 2005

(30) Foreign Application Priority Data

Feb. 19, 2001  (EP) .................................. 01103561

(51) Int. Cl.
*G06F 15/76* (2006.01)

(52) U.S. Cl. .................. 709/245; 709/238; 370/390
(58) Field of Classification Search ........ 709/238–240, 709/245, 207; 370/254, 432, 390
See application file for complete search history.

(56) References Cited

U.S. PATENT DOCUMENTS 6,667,976 B1 * 12/2003 Prasanna ..................... 370/390
6,795,858 B1 * 9/2004 Jain et al. ................... 709/226

* cited by examiner

*Primary Examiner*—Nathan Flynn
*Assistant Examiner*—Michael E Keefer
(74) *Attorney, Agent, or Firm*—Roger S. Burleigh (57) ABSTRACT

In case the first indicator specifies a number of anycast members greater than the second indicator, the number of nearest anycast members indicated by the second indicator (in the following: second number of anycast members) are skipped and not contacted, while a number of anycast members is determined for data communications with the sender up to a number obtained by a comparison of the number of anycast members specified by the first indicator (in the following: first number) and the second number. In particular, the number of nearest anycast members to be determined corresponds to the differen e between the first number and the second number. In case the first number corresponds to the second number, no further anycast members have to be determined. The same applies for the case wherein the first number is smaller than the second number.

29 Claims, 5 Drawing Sheets

IP packet
Header

METHOD AND SYSTEM FOR MULTIPLE HOSTS ANYCAST ROUTING

TECHNICAL FIELD

The present invention relates to a method and a system for establishing data communications between a sender and receivers, the number thereof being defined by the sender, wherein the receivers are not individually addressed by the sender, but selected from a group of receivers being addressed from the sender by means of a common address.

BACKGROUND OF THE INVENTION

An anycast network is a network providing a service which allows a sender to access the nearest of a group of receivers having a common address. The common address, in particular, the same anycast address for the group of receivers enables a sender to identify a plurality of receivers by providing only one address, namely an anycast address, instead of individually addressing each receiver. In contrast to a multicast system, wherein data communications are performed between a sender and all receivers sharing a common address, i.e. the same multicast address, data communications in an anycast network are performed between a sender and a particular receiver of a group of receivers sharing the same anycast address. In the context, data communications include any kind of data, such as alphanumerical, graphic, multimedia, audio, video, voice data, information, signals etc. which can be exchanged between systems, devices, network components etc. (e.g. computers, end user devices, hosts, servers, routers, modes).

In particular, data communications in an anycast network are performed between a sender and the nearest receiver of the group of receivers sharing the same anycast address. In this respect, the nearest receiver in relation to a sender is defined according to a measure of a distance employed by a routing protocol or routing system used for data communications in a respective network.

Since the routing protocol or routing system of a network which identifies the nearest receiver for accesses by a sender, the sender does not need to care about how to select the closest destination, i.e. the nearest receiver.

Usually, receivers in an anycast group are so-called replicas being able to support a same network service for a requesting sender. Examples for such replicas are mirrored web servers. For accessing a desired network service, among a group of receivers sharing the same anycast address, i.e. anycast receivers, each thereof providing the desired network service, the nearest receiver is determined and respective data communications are performed between the nearest receiver and the requesting sender. Thus, accessing the nearest receiver enhances the network performance perceived by the requesting sender, saves network capacities such as network's bandwidth, and provides the desired network service.

Figure 1:
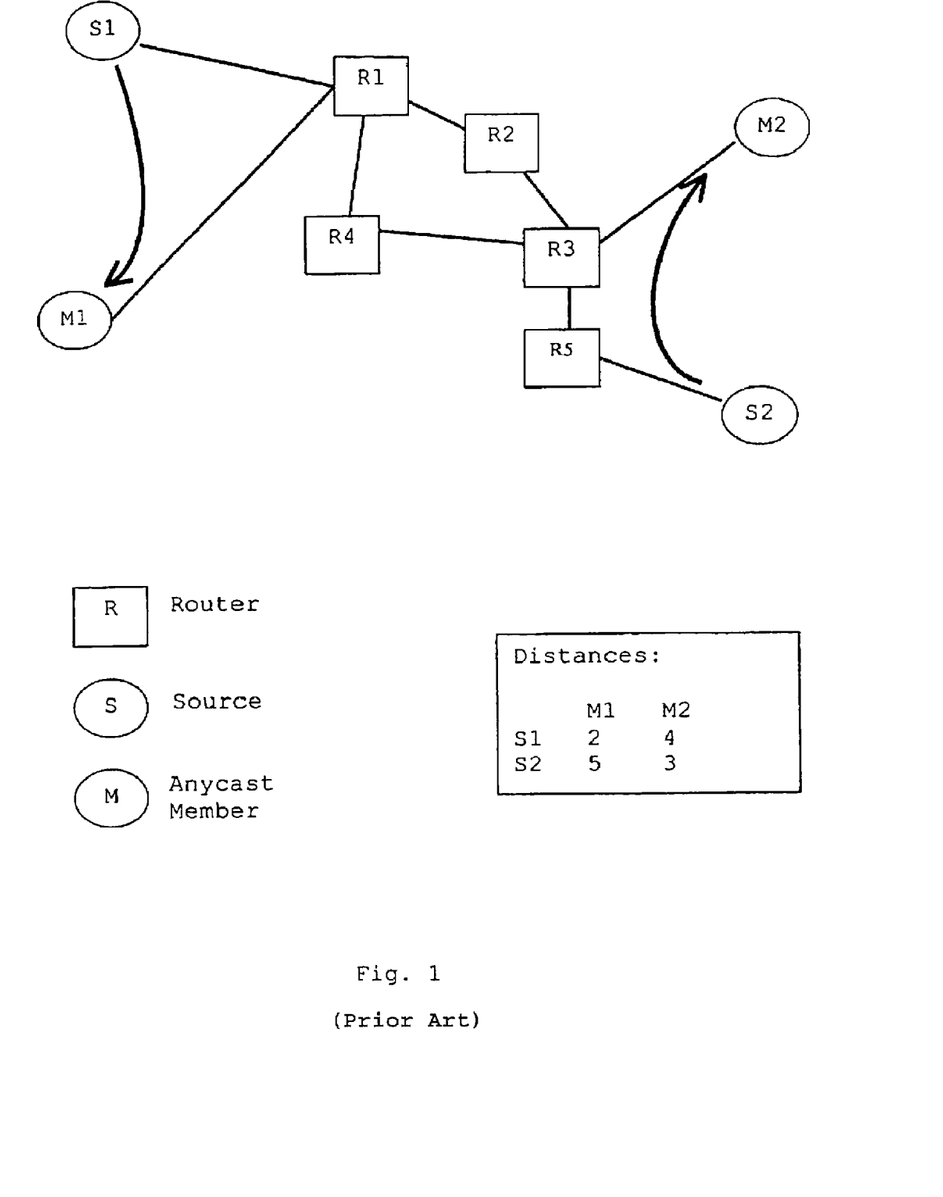
FIG. 1 illustrates the basic principle of anycast routing in a network according to the state of the art.

In FIG. 1, the basic principle of an anycast network is illustrated. Both, members M1 and M2 are members of the same anycast group and share the same respective anycast address. In line with the measure of a distance employed for routing of data in the network, the distances between requesting senders S1 and S2 and all members of the anycast group are computed. Since the distance 2 calculated for the sender S1 in relation to the anycast group members is the smallest distance, data communications will be performed between the sender S1 and the member M1 acting as a receiver for the sender S1. In this manner, it is possible for example to direct Internet Protocol (IP) datagrams from the sender S1 towards the member M1. Accordingly, data communications are established between the sender S2 and the member M2 being a nearest receiver with respect to the sender S2, for example to direct IP datagrams from the sender S2 towards the member M2.

Anycast Addresses

According to the Internet Protocol version 6 (IPv6), special anycast addresses have been specified in addition to unicast addresses for individually addressing single receivers and multicast addresses for addressing all receivers sharing the same multicast address. Anycast addresses are allocated from the address space employed for unicast addresses, using any of the formats defined for unicast addresses. As a result, anycast addresses cannot be syntactically distinguished from unicast addresses. An anycast address identifies a set of interfaces which typically belong to different nodes of a network. Data, e.g. a data packet, communicated from a sender to an anycast address is delivered to one of the interfaces identified by the respective anycast address, in particular, to the nearest interface according to the measure of a distance employed for the network routing protocol or system.

In case, a unicast address is assigned to more than one interface, thus turning the unicast address into a respective anycast address, the nodes of the network to which the address is assigned must be explicitly configured to interpret the address as an anycast address. According to the IPv6, an anycast address must not be assigned to a host, but may be assigned to an IPv6 router, only.

Usually, for any assigned anycast address, an address prefix P is utilized which identifies a topological region in which all interfaces belonging to an anycast address reside. In the region identified by the address prefix P, each member of the respective anycast group is advertised as separate entry in a network routing protocol or system. Outside the region identified by the address prefix P, the anycast address may be aggregated into the routing advertisement for the address prefix P.

Anycast Host Registration

In order to join an anycast group, a host instructs its first hop router, i.e. the closest router in relation to the host for data communications via a network, to advertise the anycast address of the anycast group on its behalf. This can be achieved by adding a new message type to either the Internet Group Management Protocol (IGMP) or the Neighbor Discovery Protocol. Then, the first hop router advertises the anycast address according to an anycast routing protocol employed for the domain including the host.

Anycast Routing

Each anycast group is confined to a particular topological region with which it shares a common address prefix. Within the topological region identified by the shared address prefix, each member of the anycast group is advertised as a separate entry in the employed unicast routing protocol or system. The principle of anycast routing within a topological region identified by an address prefix shared by an anycast group is illustrated in FIG. 2.

Figure 2:
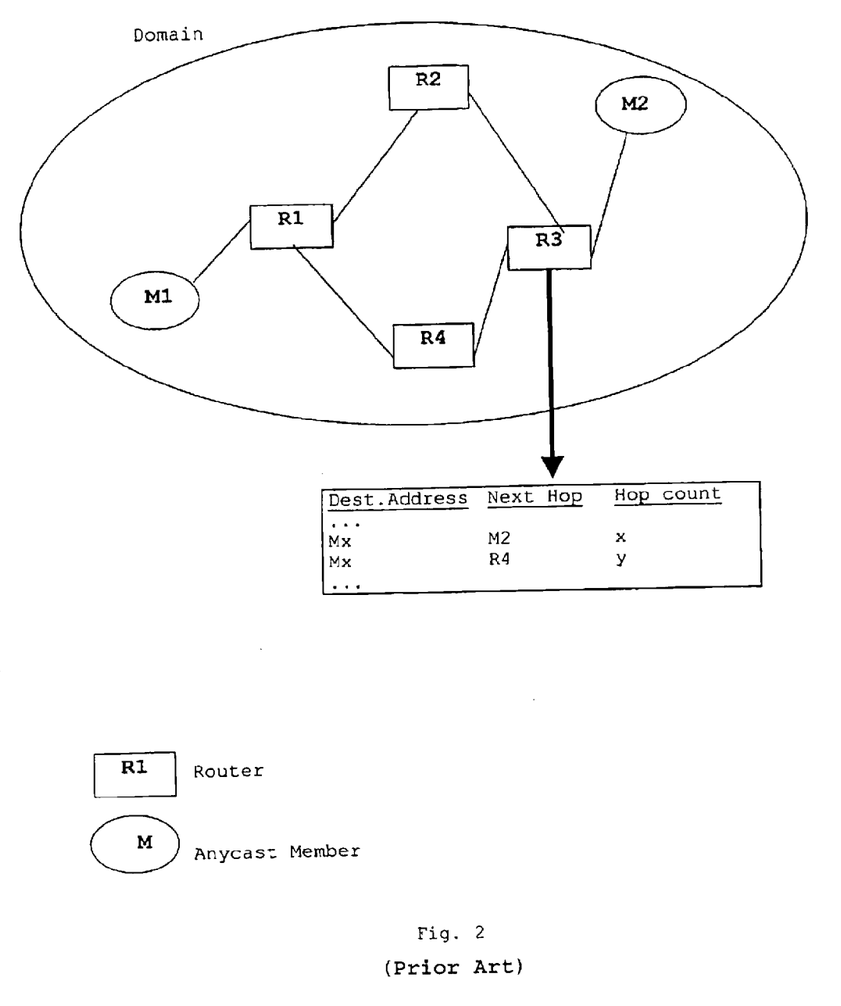
FIG. 2 illustrates an anycast routing within a topological region identified by a common address prefix according to the state of the art.

As can be derived from the table in FIG. 2, there are multiple paths to the anycast address. In case, multiple paths exist to a destination address prefix, a routing table look up of the router will return multiple next hops. The selection of the next hop router to be used for data communications, e.g. a particular data packet, depends on the implemented routing protocol or system. Further, the path selected for data communications can also be effected by the type of data communications to be performed. For example in case of the Internet Protocol standard, the Type Of Service (TOS) field in the IP header of a data packet can be used to define a data communications path. Thus, a TOS designation of a data packet would help the router to chose an appropriate communication path for the given data packet.

The selection of an appropriate path is accomplished on the basis on a determination of the distances to the destination defined by the address prefix according to a measure of distance of the respective routing protocol or system. In case of the Internet Protocol standard, for example, the OSPF knows the distance related to the corresponding matrix as identified in the TOS field of a data packet to the destination, i.e. the hop count. As a result, for an anycast routing it is possible to select the nearest next hop on the basis of the employed matrix. In this respect, it is not necessary to analyze the whole IP address of a given data packet. In FIG. 2, this in indicated by the destination address Mx wherein only the prefix "M" is analyzed.

For an anycast routing outside the topological region identified by the shared address prefix, the anycast address may be aggregated into the routing advertisement for the shared address prefix. This principle is illustrated in FIG. 3.

Figure 3:
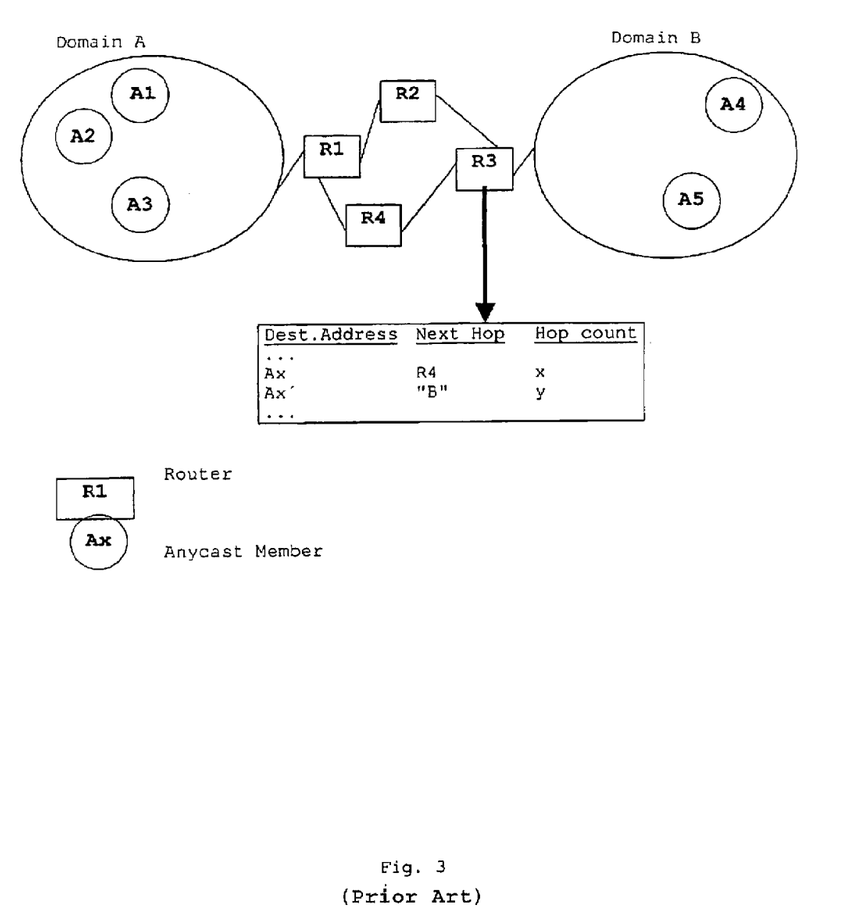
FIG. 3 illustrates an anycast routing outside a topological region identified by a common address prefix according to the state of the art.

The destination address Ax in FIG. 3 denotes that only the shared address prefix is utilized in order to determine that data communications are to be routed to the corresponding domain. Since the anycast address for the anycast group shares the address prefix with network domain A, network domain B cannot aggregerate the anycast address in its address prefix. Therefore, network domain B should advertise the anycast address as a separate entry covering both anycast members A4 and A5. This is indicated in FIG. 3 by the destination address Ax being based on the address prefix for domain A and destination address Ax' containing the complete anycast address. The routing for data communications within the network domains A and B is performed as described before with reference to FIG. 2.

Strict and Loose Routing

According to the Internet Protocol version 4 (IPv4) and the Internet Protocol version 6 (IPv6), the following options for routing data communications from a source (e.g. sender, requesting system) to a destination (e.g. receiver, accessed system) have been defined as part of the IP data packet header:

Strict Routing

This option defines a complete data communications path from a source to a destination by means of a sequence of IP addresses. Data to be communicated between the source and the destination is required to exactly follow the defined path.

Loose Routing

This option specifies a number of routers and an order thereof. Data to be communicated from a source to a destination is required to traverse the specified routers in the specified order, but is allowed to be communicated via other routers on its way from the source to the destination.

Problems

Existing solutions for networks being capable of anycast routing are restricted to the selection of a single nearest receiver for data communications with an accessing sender. In case a sender intends to access more than one receiver, existing anycast networks do no provide such a service. A situation for which accesses to more than one receiver are desired is, for example, a network user wanting to access a number of nearest network servers in order to negotiate for the best network service conditions. A further example is a network user wishing to contact a number of nearest restaurants by accessing the network servers thereof in order to check e.g. meals, prices, available seats, etc. or wishing to access a number of nearest emergency service providers in order to ensure that at least one is able to assist (note for the latter examples, sufficient information for the accessing user is only provided in case there is a geographical relationship between the restaurants and the emergency service providers and the corresponding servers).

In conventional networks, accesses to more than one receiver can be accomplished by accessing a number of receivers by individually addressing the same on the basis of a unicast routing or by accessing a group of receivers by commonly addressing the same on the basis of a shared multicasting address. Such a multiple unicast routing requires that an accessing user must know each individual network address of the desired receivers and individually perform accesses thereto. This is a time consuming procedure which cannot lead to the desired information for a user in a case, for example, he/she is not provided the respective network addresses and/or information concerning distances to the accessed servers. With respect to the above given example concerning a negotiation for the best network service conditions by accessing a number of nearest servers, such a multiple unicast routing is also not appropriate since no information indicative of distances to receivers is provided and/or available. Accesses on the basis of a multicast routing can result in a number of contacted receivers being too high in view of the demands and desired information of a requesting sender/user. Further, with multicast routing it is not possible to access a desired number of receivers and, in particular, a desired number of nearest receivers, since all receivers being a member of the respective multicasting group are addressed together.

Furthermore, a second attempt, e.g. by a multiple unicast routing, to access/contact receivers, the number thereof being higher compared to the number of receivers specified in a preceding, first attempt, would unnecessarily return the results from the first attempt again. This repetition of data communications with respect to the result of the first attempt unnecessarily utilizes network resources in case the requesting network user is not interested in being provided the first attempt results again.

OBJECT OF THE INVENTION

The object of the present invention is to provide for a method and a system allowing for accesses of a sender to a specified number of nearest receivers and/or data communications between a sender and a specified number of nearest receivers.

The approach underlying the present invention to obtain the above object is to extend principles employed in existing anycast networks for accessing a single nearest client in order to allow for a multiple anycast routing to a specified number of nearest receivers. In principle, this is achieved by associating data communications from a sender directed to a network by means of an anycast routing to data which indicate the number of nearest receivers. In particular, such data which will be referred to as a first indicator in the following, specifies the number of nearest receivers being anycast members of an anycast group identified by an anycast address given by the sender (left) to be contacted by and/or allocated for the sender for data communications, such as requests, accesses, data transmissions, etc.

According to the present invention, a method for multiple hosts anycast routing in a network is provided wherein sender data is communicated from a sender to an anycast group including anycast members. For communicating the sender data to the anycast group, the sender data includes an anycast address for addressing the anycast group. In order to specify a number of the anycast members for data communications with the sender, the sender data further includes a first indicator being indicative of the desired, first number of anycast members. On the basis of the sender data, a number of nearest anycast members is determined as hosts with respect to the sender for data communications. In particular, the number of nearest anycast members being determined is defined by the first indicator.

This solution provides for data communications between a sender and a number of receivers without addressing the same separately, but addressing a plurality of possible receivers by a single address being common for all receivers and selecting a desired number therefrom by means of a data being simply amended to the single common address. A further benefit is that it can be employed for any network, even for networks not providing known anycast routing services.

After having performed the above described method it may be possible that a further multiple host anycast routing should be performed wherein the number of anycast members to be determined is varied compared to the number of anycast members previously specified. In order to avoid that anycast members already determined in the previous multiple host anycast routing are contacted again a second indicator can be used. The second indicator specifies the number of anycast members previously determined in the preceding multiple host anycast routing. Then, the number of nearest anycast members can be determined on the basis of the first and the second indicator.

In case the first indicator specifies a number of anycast members greater than the second indicator, the number of nearest anycast members indicated by the second indicator (in the following: second number of anycast members) are skipped and not contacted, while a number of anycast members is determined for data communications with the sender up to a number obtained by a comparison of the number of anycast members specified by the first indicator (in the following: first number) and the second number. In particular, the number of nearest anycast members to be determined corresponds to the difference between the first number and the second number. In case the first number corresponds to the second number, no further anycast members have to be determined. The same applies for the case wherein the first number is smaller than the second number.

In order to provide for a method according to the invention for multiple hosts anycast routing to be employed in a network providing a known anycast routing, a first indicator specifying a first number of anycast members to be contacted/allocated for data communications is associated to an anycast address. By means of the anycast address, an anycast group having anycast members is identified in the network. To establish the desired data communications, at least the anycast address and the first indicator is communicated in the network to the anycast group. The anycast group is identified by the anycast address, while the number of anycast members to be contacted/allocated for data communications is selected according to the first indicator. In particular, the first indicator defines the number of nearest anycast members and according to the first indicator, the specified number of nearest anycast members is determined as hosts for data communications in the network.

Comparable to the embodiment of the above described method for multiple hosts anycast routing in a network, this method for multiple hosts anycast routing in an anycast capable network can employ a second indicator specifying a number of anycast members (in the following: second number) already determined for data communications in the network, e.g. on the basis of a previously performed multiple hosts anycast routing in a (anycast capable) network.

For providing the first and/or the second indicator, it is possible to include the indicator(s) in the anycast address or to extend the same by the first and/or the second indicator.

Preferably, the anycast address is included an anycast address prefix which identifies a topological region in the network, the topological region confining the anycast group. Here it is possible, that the anycast address prefix includes the first and/or the second indicator or is extended by the same.

In a case of a network being operated according to an Internet Protocol standard (e.g. IPv4 or IPv6) the anycast address and the indicator can be communicated by a transmission of an Internet Protocol data packet header which includes at least the anycast address.

For communicating the first and/or the second indicator, the Internet Protocol data packet header can be included the first and/or the second indicator as a part of or an extension for the anycast address. With respect to the options mechanisms defined for the Internet Protocols, the first and/or the second indicator can be provided by extending the Internet Protocol data packet header by an options field and, in particular, a so-called multiple anycasting options field including the first and/or the second indicator.

It is preferred, that the property "nearest" of anycast members is determined according to a measure of distance of the respective routing protocol employed for the network. In particular, "nearest" may be understood as the shortest distance between a sender and anycast members. Additionally or as an option, "nearest" may be specified according to a distance metric requested by the sender. Usually, the distance metric requested by the sender, e.g. in the TOS field of an IP header, indicates a smaller distance metrics or nearest distance, respectively.

In case the network comprises domains at least some of which including at least of the anycast members, the anycast address and the first and/or the second indicator can be communicated via network routers to and/or between domains having anycast members.

Since it is assumed that a nearest network domain will also include anycast members being nearer compared to anycast members of more distant domains, it is preferred that the ordering of routers for network domain communications is set up such that the anycast address and the first and/or the second indicator are communicated to nearest network domains. The nearest network domains may specified according to a measure of distance of a routing protocol for the network and/or according to a (e.g. smallest) distance metric requested by the sender, e.g. in the TOS field.

In order to provide for a fast multiple anycasting, the number of anycast members can be contacted sequentially, in particular for a small number specified by the first and/or the second indicator.

Within a network domain, multiple anycast routing and, in particular, a communication of the anycast address and the first and/or the second indicator can be accomplished on the basis of data identifying each of the anycast members. Such an identifying data can be, for example, provided by means of separate entries for anycast members in a routing table according to the employed routing protocol.

With respect to the anycast routing performed for a network domain, the first indicator can be updated by decreasing the same according to a number of anycast members comprised by a network domain being identified by means of the anycast address and receiving the first indicator.

Further, the anycast routing can be enhanced by multiplying the anycast address and the first and/or the second indicator and communicating the multiplied anycast addresses and indicators to network domains and/or anycast members. Here, it is preferred to communicate the multiplied data simultaneously to the further network domain and/or anycast members.

In order to precisely select the specified number of anycast members, while determining the number of anycast members, the indicator is modified according to a number of already determined/contacted/allocated nearest anycast members such that the modified indicator being communicated in the network specifies a number of anycast members still to be determined as receivers. This embodiment avoids a utilization of further data beside the indicator to provide information how many receivers are already obtained and how many are still to be selected.

According to an Internet Protocol standard, the communication in the network can be performed by using the strict routing mechanism or the loose routing mechanism.

Preferably, the first and the second indicator are communicated together and, advantageously in the same manner, e.g. both indicators being included in the anycast address or extending the same.

Further, the present invention provides a system for multiple hosts anycast routing and an anycast routing capable network which are preferred to be operated according to the method according to the invention as set forth above.

Moreover, the present invention provides a computer program product being adapted to carry out the method steps according to the invention and embodiments thereof as set forth above.

BRIEF DESCRIPTION OF THE FIGURES

In the following description of preferred embodiments of the present invention it is referred to the accompanying figures wherein.

DESCRIPTION OF PREFERRED EMBODIMENTS

In order to promote the understanding of the present invention preferred embodiments are described with respect to an network according to the Internet Protocol standard. In such a network, data communications are performed by transmitting IP data packets, short packets, each including an IP packet header, short header, between hosts, i.e. sending and receiving systems within the network. Each host is associated to a network domain defining a topological network region. Data communications between network domains are performed via exterior gateway routers, whereas data communications within a network domain are performed via interior gateway routers. Exterior gateway routers directly receiving packets from a network domain are called first exterior gateway routers and interior gateway routers directly receiving packets from an exterior gateway router are called border routers. Hops designate network components via which packets are communicated. In particular, hops include hosts and routers. For data communications in the network, i.e. routing of packets from a source to a destination, different routing protocols are used for transmission within a domain (intra-domain routing) and between domains (inter-domain routing). For example, an intra-domain routing can be based on interior gateway routing protocols, such as OSPF, while inter-domain routing can employ exterior gateway routing protocols such as BGP. According to the routing protocols, a routing table is defined which specifies a communication path for packets from a source to a destination and, in particular, hops via which packets are to be transmitted. As explained above, both, loose routing and strict routing are possible, whereas for a multiple hosts anycasting most probably loose routing will be applied.

IP packet headers include information specifying a destination in the network to which packets are to be communicated from a source by means of destination addresses. In case of unicast routing a destination corresponds to a receiving host, short receiver, whereas in case of multicast routing, conventional anycast routing, and, specifically, multiple host anycast routing a destination comprises a group of hosts each thereof, only one thereof, and a specified number thereof acting as receiver(s) with respect to a sending host, short sender.

In case of a multiple hosts anycast routing, short multiple anycasting, the number of hosts, i.e. members of an anycast group, to be contacted is specified by extending a packet and, in particular, its header by an indicator. The indicator providing information of the number of hosts to be contacted/allocated as originally specified by the sender and the number of hosts which still have to be contacted/allocated as receivers indicates the number of hosts that (still) have to be informed by the corresponding branch utilizing the following embodiments.

Indicator as Part of the IP Destination Address Field in the IP Header

Since anycast routing is mostly based on resolving the above described address prefix, data (e.g. some bits) of an IP destination address and, in particular, an address prefix is used for the indication of a sender-specified number of nearest hosts being anycast members of an anycast group indicated by the address prefix.

Figure 4:
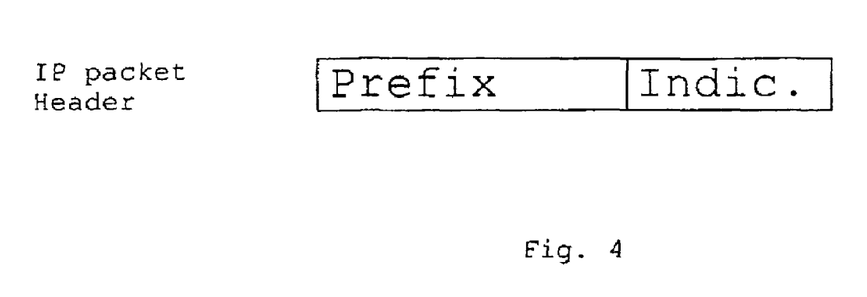
FIG. 4 illustrates a data structure for an anycast address according to the present invention.

In the exemplary illustration of FIG. 4, the IP packet header includes an anycast address prefix and an indicator specifying the number of nearest anycast members (left) to be contacted/allocated. Initially, the indicator specifies the number of nearest anycast members as desired by a sender, while communicating the packet within the network the indicator is decreased corresponding with the number of already selected receivers (already allocated anycast members).

For the examples given above wherein more than one host is to be contacted as receiver, it is assumed that the sender specified number of desired nearest anycast members is rather low, e.g. less than 10. In such applications of multiple anycasting, it might be sufficient to, for example, use 4 bits of an IP packet header for the indicator to allow for a maximum of $2^4$(16) nearest anycast members to be contacted. In applications wherein a specification of a higher number of nearest anycast members should be provided, the amount of data (e.g. number of bits) of an IP packet header is to be set correspondingly.

Indicator as New Options Extension to an IP Extension of an IP Header

On the basis of existing IP options mechanism (e.g. as explained above with respect to strict and loose routing), an IP packet header is extended by a so-called "multiple anycasting" options field containing an indicator as specified above. In case a packet is destinated for an anycast address, the respective header including anycasting address information, anycast capable routers only analyses the extension, namely the "multiple anycasting" option field. Modifications of the extension can be performed, for example, to update the "multiple anycasting" option field to be in line with the number of anycast members still to be contacted/allocated in view of already contacted/allocated anycast members.

Figure 5:
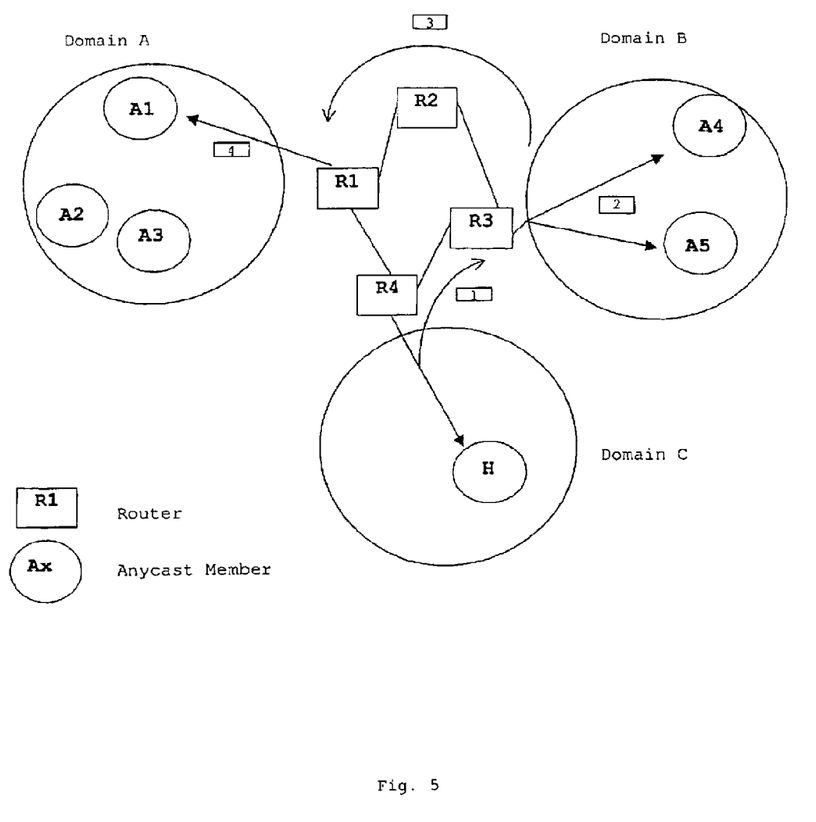
FIG. 5 illustrates a multiple anycast routing according to the present invention.

As set forth above, data communications are differently performed for intra-domain and inter-domain communications. As a result, multiple anycasting will work different for intra-domain cases employing interior gateway routing protocols such as OSPF and inter-domain cases employing exterior gateway protocols such as BGP. In the following inter-domain multiple hosts anycasting and intra-domain multiple hosts anycasting will be described with reference to FIG. 5 illustrating an exemplary topology and routing scenario wherein a host H in a domain C communicates an anycast packet within a network comprising domains A, B and C and exterior gateway routers R1, R2, R3 and R4. For this example it is assumed that the anycast group addressed by the host H comprises the anycast members A1, A2 and A3 in domain A and anycast members A4 and A5 in domain B. In particular, host H communicates an anycast packet including an indicator specifying a number of three anycast members to be contacted as receivers, i.e. nearest anycast members.

Inter-domain Multiple Hosts Anycasting

Inter-domain multiple hosts anycasting is indicated by steps 1 and 3 shown in FIG. 5. On the basis of an employed exterior gateway routing protocol, the first exterior gateway router with respect to host H in domain C, i.e. router R4, will check its routing tables in order to determine anycast members of the anycast group as specified by the anycast packet of host H and, in particular, all domains including the respective anycast members. The corresponding routers for determined domains, i.e. routers R1 and R3 to domains A and B, will be added to the IP packet header of the anycast packet from host H by utilizing strict or loose routing options. Depending on the metrics used for the employed exterior gateway routing protocol and/or the smallest distance metric requested by the sender, i.e. host H, (e.g. defined in the TOS field), the ordering of the routers will be based on distances between domains including anycast members and anycast members, respectively, and host H. According to FIG. 5, the anycast packet of host H will be first communicated to router R3. In case the number of anycast members contacted/allocated in a domain receiving the anycast packet from router R3 is less than the number of nearest anycast members to be contacted as defined by host H, the anycast packet will be communicated to router R1. The anycast packet and, in particular, the header thereof transmitted to router R1 includes an indicator specifying the number of anycast members which are still to be contacted/allocated. With reference to FIG. 5, the indicator communicated to router R1 indicates that one anycast member is to be contacted/allocated assuming that anycast members R4 and R5 of domain B are selected as nearest anycast members.

As specified by the strict or loose routing options of the IP packet header, the specified number of anycast members may be contacted sequentially. Assuming the specified number being rather low, e.g. 2 to 5 anycast members, this procedure will not effect the network service performance received by requesting host, here host H. In case a high number of anycast member should be allowed to be specified by a sender/requesting host, various known data communication methods for enhancement of data transmissions in a network can be utilized for contacting anycast members.

Intra-domain Multiple Hosts Anycasting

Intra-domain multiple hosts anycasting will be explained with reference to steps 2 and 4 of FIG. 5. At reception of an anycast packet in an border router for a domain, the border router will forward the anycast packet to all next hops, in particular, to the next anycast members of the respective domain. This can be accomplished since, as explained above, interior gateway routing protocols provide a separate entry in the routing table for each anycast member. For forwarding the anycast packet, the border router may multiply the anycast packet and simultaneously communicate the multiplied anycast packets to multiple destinations, i.e. next hops/anycast members. According to the number of anycast members and, in particular, of anycast members contacted/allocated in the corresponding domain, the number specified by the indicator in the header of the anycast packet is decreased. In case the indicator is 0 after an intra-domain multiple host anycasting, no data communications are required to contact/allocate further anycast members, e.g. of a different domain, since the number of nearest anycast members as desired by a requesting host is provided. Otherwise, the border router will forward the anycast packet including the decreased indicator to the next exterior gateway router for inter-domain multiple hosts anycasting as specified above.

According to FIG. 5, a border router of domain B receives the anycast packet from exterior gateway router R3 and will forward the anycast packet to the anycast members A4 and A5. For example, router R3 may serve as border router for domain B by combining exterior and interior gateway functions. In step 2 the border router of domain B contacts all anycast members in domain B such that they are specified for nearest anycast members for data communications with host H. As a result, still one further anycast member has to be contacted/allocated, whereby the anycast packet communicated from the border router of domain B via the exterior gateway router R3 to the exterior gateway router R1 includes a correspondingly decreased indicator, i.e. an indicator having the value of 1. A border router of domain A forwards the received anycast packet within domain A as specified above for contacting/allocating an anycast member. Comparable to router R3, router R1 combining exterior and interior gateway capabilities may be operated as border router for domain A.

The routing within a domain may be performed in a manner comparable as the above described inter-domain routing in case hierarchies are used for the respective domain. Then, all levels of the same hierarchy in the domain can be contemplated as inter-domain cases, wherein levels of a lower hierarchy can be seen as intra-domain cases.

Skipping the Number of Anycast Members Specified in a First Multiple Hosts Anycasting for Performing a Second Multiple Hosts Anycasting After having performed a first multiple hosts anycasting, it is possible that the respective host performs a second multiple hosts anycasting wherein the number of anycast members specified in the first multiple hosts anycasting should not be contacted/allocated (again). For that purpose it is contemplated as an ad-on to the above described multiple hosts anycast routing, but also to the existing anycast specification as known in the state of the art, that a sending/requesting host can specify the number of first anycast members (i.e. anycast members contacted/allocated in a first anycasting) that should be not contacted/allocated (again) in a second (multiple hosts) anycasting.

After a previous attempt did not result in a successful anycast member search there may be no need to contact/allocate the same anycast members once more if the number of anycast members is to be extended in a subsequent attempt. In that case, the sending/requesting host could specify in a new optional IP header extension the number of first anycast members that should not be contacted/allocated in the subsequent attempt. Such an indication can be provided by a second indicator (counter) which is additionally checked, e.g. by routers, while performing the second (multiple hosts) anycast routing.

In case a network domain includes anycast members, the additional indicator (counter) is first checked. If the second indicator indicates a number greater than 0, the second indicator is to be decreased until it reaches 0. For each decrease of the second indicator, the first multiple hosts indicator (counter), as described above, is decreased as well, but without contacting/allocating an anycast group member. In this way, it is ensured that the number of anycast members contaced/allocated in the first, preceding (multiple hosts) anycasting is not contacted again in the second attempt. As set forth above, this optional addition may already be implemented in the single hosts anycasting as known in the state of the art.

The invention claimed is:

1. A method for multiple hosts anycast routing in a network, the method comprising the steps of:
    communicating sender data from a sender addressed to an anycast group including anycast members, said sender data including an anycast address for addressing said anycast group and a first indicator specifying a first number of said anycast members within said anycast group for data communications with said sender, and
    determining a plurality of nearest ones of said anycast members within said anycast group as hosts for said data communications with said sender, wherein said plurality of nearest ones of said anycast members corresponds to the number specified in said first indicator, whereby said sender can communicate with said plurality of nearest ones of said anycast members without separately addressing each one thereof.

2. The method according to claim 1, further comprising the steps of:
    communicating further sender data from said sender addressed to said anycast group including said anycast members, said further sender data including a second indicator specifying a second number of said anycast members within said anycast group, said second number being indicative of previously-determined nearest ones of said anycast members within said anycast group, and
    determining said nearest ones of said anycast members for communication with said sender as a function of said first and said second indicators.

3. The method according to claim 2, wherein
    said number of nearest anycast members to be determined is defined by the difference between said first number and said second number.

4. The method according to claim 2, wherein
    said first and/or said second indicator is included in said anycast address.

5. The method according to claim 2, wherein
    said anycast address is extended by said first and/or said second indicator.

6. The method according to claim 2, wherein
    an anycast address prefix is included in said anycast address, said anycast address prefix identifying a topological region in said network confining said anycast group, said anycast address prefix including said first and/or said second indicator or being extended by said first and/or said second indicator.

7. The method according to claim 2, wherein
    said anycast address and said first and/or said second indicator are communicated by communicating an Internet Protocol data packet header including said anycast address.

8. The method according to claim 7, wherein
    said first and/or said second indicator is included in said Internet Protocol data packet header as a part or an extension of said anycast address, or
    said Internet Protocol data packet header is extended by said first and/or said second indicator by means of an options field for Internet Protocol data packet headers.

9. The method according to claim 2, wherein
    said anycast address and said first and/or said second indicator are communicated in said network between domains thereof via routers to network domains having at least one of said anycast members.

10. The method according to claim 9, wherein
    an ordering of said routers is defined such that said anycast address and said first and/or said second indicator are communicated to the nearest network domains, the nearest network domains being specified according to a measure of distance of a routing protocol for said network and/or according to a measure of distance specified by said sender.

11. The method according to claim 2, wherein said first indicator is modified according to a number of already determined nearest anycast members such that said modified indicator specifies a number of said anycast members still to be determined as receivers.

12. The method according to claim 11, wherein
    said first indicator is decreased by the value of said second indicator.

13. The method according to claim 2, wherein
    said second indicator is decreased to a value corresponding to a number of 0 and said first indicator is decreased correspondingly to the decrease of the second indicator and
    said determining of said number of nearest ones of said anycast members within said anycast group is performed in dependence of said decreased first indicator if said second indicator has said value corresponding to said number of 0.

14. The method according to claim 2, wherein said first and said second indicator are communicated together.

15. The method according to claim 1, wherein said number of nearest anycast members is determined by utilizing a measure of distance of a routing protocol for said network and/or determined by utilizing a measure of distance specified by said sender.

16. The method according to claim 1, wherein said number of anycast members is contacted sequentially.

17. The method according to claim 1, wherein said first number specified by said first indicator is decreased corresponding to a number of said anycast members in a network domain to which said anycast address and said first indicator are communicated.

18. The method according to claim 1 wherein said communicating is performed according to a strict routing mechanism or a loose routing mechanism as defined for Internet Protocol.

19. A method for multiple hosts anycast routing in an anycast capable network, the method comprising the steps of:

associating a first indicator with an anycast address identifying an anycast group having anycast members in said network, said first indicator specifying a first number of said anycast members within said anycast group, communicating at least said anycast address and said first indicator in said network to said anycast group, and determining a plurality of nearest ones of said anycast members within said anycast group as hosts for data communications in said network, said plurality of nearest ones of said anycast members being defined by said first indicator, whereby said sender can communicate with said plurality of nearest ones of said anycast members without separately addressing each one thereof.

20. The method according to claim 19, further comprising the steps of:

associating a second indicator with said anycast address, said second indicator specifying a second number of said anycast members within said anycast group, said second number being indicative of previously-determined nearest ones of said anycast members within said anycast group, communicating at least said anycast address, said first indicator and said second indicator in said network to said anycast group; and, determining said nearest ones of said anycast members for communication with said sender as a function of said first and said second indicators.

21. The method according to claim 20, wherein said number of nearest anycast members to be determined is defined by the difference between said first number and said second number.

22. The method according to claim 20, wherein said first and/or said second indicator is included in said anycast address.

23. The method according to claim 20, wherein said anycast address is extended by said first and/or said second indicator.

24. The method according to claim 20, wherein an anycast address prefix is included in said anycast address, said anycast address prefix identifying a topological region in said network confining said anycast group, said anycast address prefix including said first and/or said second indicator or being extended by said first and/or said second indicator.

25. The method according to claim 20, wherein said first indicator is modified according to a number of already determined nearest anycast members such that said modified indicator specifies a number of said anycast members still to be determined as receivers.

26. The method according to claim 25, wherein said first indicator is decreased by the value of said second indicator.

27. The method according to claim 19, wherein said number of nearest anycast members is determined by utilizing a measure of distance of a routing protocol for said network and/or determined by utilizing a measure of distance specified by said sender.

28. A system for multiple hosts anycast routing, comprising:

a network a sender, and a group of receivers identified by a common anycast address, wherein data communications between said sender and a number of nearest ones of said receivers are established based on a first indicator provided by said sender specifying said number of receivers, whereby said sender can communicate with a plurality of nearest ones of said anycast members without separately addressing each one thereof.

29. The system according to claim 28, wherein said data communications between said sender and said number of nearest of said receivers are further established based on a second indicator provided by said sender specifying a number of receivers previously-determined for said data communications with said sender.

* * * * *